United States Patent
Ota et al.

(10) Patent No.: US 10,570,323 B2
(45) Date of Patent: Feb. 25, 2020

(54) REFRIGERANT COMPOSITION AND REFRIGERATION CYCLE APPARATUS INCLUDING REFRIGERANT COMPOSITION

(71) Applicant: Hitachi-Johnson Controls Air Conditioning, Inc., Tokyo (JP)

(72) Inventors: Ryo Ota, Tokyo (JP); Koji Naito, Tokyo (JP); Yasutaka Yoshida, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 16/360,173

(22) Filed: Mar. 21, 2019

(65) Prior Publication Data

US 2019/0382638 A1 Dec. 19, 2019

Related U.S. Application Data

(63) Continuation of application No. PCT/JP2018/022619, filed on Jun. 13, 2018.

(51) Int. Cl.
*C09K 5/04* (2006.01)
*F25B 1/04* (2006.01)
*F25B 31/00* (2006.01)

(52) U.S. Cl.
CPC .............. *C09K 5/045* (2013.01); *F25B 1/04* (2013.01); *F25B 31/002* (2013.01);
(Continued)

(58) Field of Classification Search
CPC ............... C09K 5/045; C09K 2205/22; C09K 2205/122; C09K 2205/126; F25B 31/002; F25B 1/04; F25B 2400/12
See application file for complete search history.

(56) References Cited

U.S. PATENT DOCUMENTS

| | | | |
|---|---|---|---|
| 5,547,593 A * | 8/1996 | Sanechika | C07C 43/225 508/207 |
| 5,954,995 A * | 9/1999 | Goble | C09K 5/045 252/67 |

(Continued)

FOREIGN PATENT DOCUMENTS

| | | |
|---|---|---|
| JP | 04-288452 A | 10/1992 |
| JP | 2017-110225 A | 6/2017 |

(Continued)

OTHER PUBLICATIONS

International Search Report of PCT/JP2018/022619 dated Sep. 18, 2018.

*Primary Examiner* — Kun Kai Ma
(74) *Attorney, Agent, or Firm* — Mattingly & Malur, PC

(57) ABSTRACT

Provided is a refrigerant composition as a mixed refrigerant containing refrigerant components of difluoromethane (HFC32), pentafluoroethane (HFC125), and hexafluoropropene (FO1216). The makeup of the refrigerant components in the mixed refrigerant is configured such that a global warming potential (GWP) is 750 or less, a vapor pressure at 25° C. is in a range of 1.4 to 1.8 MPa, and a flame retardant parameter $F_{mix}$ represented by formula (1) below is 0.46 or more.

$$F_{mix} = \Sigma_i F_i x_i \quad (1)$$

Here, $F_{mix}$ indicates a flame retardant parameter of the refrigerant composition, $F_i$ indicates a flame retardant parameter of each of the refrigerant components, and $x_i$ indicates a molar fraction of each of the refrigerant components.

9 Claims, 2 Drawing Sheets

(52) U.S. Cl.
CPC .. *C09K 2205/122* (2013.01); *C09K 2205/126* (2013.01); *C09K 2205/22* (2013.01); *F25B 2400/12* (2013.01)

(56) References Cited

U.S. PATENT DOCUMENTS

| | | | |
|---|---|---|---|
| 6,019,909 A * | 2/2000 | Ide | C07C 43/12 208/18 |
| 9,938,442 B2 | 4/2018 | Spatz et al. | |
| 2003/0209685 A1* | 11/2003 | Robin | A62D 1/0057 252/2 |
| 2006/0197053 A1* | 9/2006 | Shiflett | C09K 5/047 252/67 |
| 2007/0019708 A1* | 1/2007 | Shiflett | F25B 25/02 374/181 |
| 2007/0295478 A1* | 12/2007 | Shiflett | C09K 5/041 165/60 |
| 2008/0092648 A1* | 4/2008 | Zhou | G01N 21/3504 73/335.01 |
| 2010/0154419 A1* | 6/2010 | Kontomaris | C09K 5/047 60/645 |
| 2016/0002518 A1* | 1/2016 | Taniguchi | C09K 5/044 252/67 |
| 2016/0347693 A1* | 12/2016 | Fukushima | C07C 17/23 |
| 2018/0051198 A1 | 2/2018 | Okamoto et al. | |

FOREIGN PATENT DOCUMENTS

| | | |
|---|---|---|
| JP | 2018-44169 A | 3/2018 |
| WO | 2016/182030 A1 | 11/2016 |
| WO | 2017/145245 A1 | 8/2017 |

\* cited by examiner

REFRIGERANT COMPOSITION AND REFRIGERATION CYCLE APPARATUS INCLUDING REFRIGERANT COMPOSITION

CROSS-REFERENCE TO RELATED APPLICATION

The present application is a continuation application of International Application No. PCT/JP2018/022619, filed Jun. 13, 2018. The contents of this application are incorporated herein by reference in their entirety.

BACKGROUND

1. Technical Field

The embodiments described herein relate to a refrigerant composition having a small global warming potential (GWP), and a refrigerator cycle apparatus including the refrigerant composition.

2. Description of the Related Art

Various measures for inhibiting global warming are being internationally taken. The 21st United Nations Climate Change Conference (COP 21) held in 2015 adopted the Paris Agreement to hold the increase in the global average temperature to well below 2° C. above pre-industrial levels, and to pursue efforts to limit the temperature increase to 1.5° C.

The average temperature increase is presently about 1° C. above pre-industrial levels. For achieving an average temperature increase of within 2° C., it is necessary to limit the average $CO_2$ concentration to 450 ppm. However, from the current status of the $CO_2$ emission increase, it is estimated that this level will be exceeded in 30 years. Japan has declared its intention to proceed with a policy to set a goal to limit the temperature increase to 1.5° C., and is thus expected to face severe situations in dealing with the policy.

As a refrigerant used in refrigerating and air-conditioning equipment, a fluorine compound is often used from the viewpoint of safety, except for small-scale equipment. The existence of a bond between carbon C and fluorine F in a fluorine-based refrigerant, that is, a C—F bond, reduces combustibility. However, it causes an infrared absorption region to exist in a window region (a wavelength region other than an atmosphere absorption wavelength) of earth radiation (black body radiation of 288 K on average: mainly infrared light), or the lifetime in the atmosphere to be lengthened due to large binding energy. As a result, a global warming potential (GWP) is likely to become high.

For this reason, laws for inhibiting global warming which involves a fluorine compound are being developed in Japan. Regarding the use and control of a fluorine-based refrigerant used in refrigerating and air-conditioning equipment, controlled equipment and substances are stipulated in the "Act on Rational Use and Proper Management of Fluorocarbons (Fluorocarbons Emission Control Law)."

Specific controlled substances are ozone-depleting substances (mainly a fluorine compound containing chlorine or bromine) controlled in the "Act on the Protection of the Ozone Layer Through the Control of Specified Substances and Other Measures" and substances (mainly a high-GWP substance containing hydrogen, fluorine, and carbon) stipulated in the "Act on Promotion of Global Warming Countermeasures." In such a worldwide trend toward controlling refrigerants, combustibility tends to increase as the GWP of refrigerants decreases.

Since R410A [HFC (Hydrofluorocarbon) 32/HFC125 (50/50% by weight)] and R404A [HFC125/HFC143a/HFC134a (44/52/4% by weight)] as a refrigerant used in a refrigeration cycle apparatus (refrigerating and air-conditioning equipment) have a GWP as high as R410A=1924 and R404A=3943 respectively, it has become necessary to develop a refrigeration cycle apparatus including an alternative refrigerant having a low GWP.

From reasons such as thermophysical properties, low GWPs, low toxicity, low combustibility, and others, examples of this alternative refrigerant include difluoromethane (HFC32) (GWP=677), 2,3,3,3-tetrafluoropropene (HFO (hydrofluoroolefin) 1234yf) (GWP=0), 1,3,3,3-tetrafluoropropene (HFO1234ze) (GWP=1), trifluoroethene (HFO1123) (GWP<1), 3,3,3-trifluoropropene (HFO1243zf) (GWP=0), or mixed refrigerants of HFO, HFC32, HFC125, HFC134a, and others, hydrocarbons such as propane and propylene, and low-GWP hydrofluorocarbons such as monofluoroethane (HFC161) and difluoroethane (HFC152a).

Among these refrigerant candidates, a mixed refrigerant containing a hydrofluoroolefin-based refrigerant (such as HFO1234yf, HFO1234ze, and HFO1123), which has a combustibility property significantly lower than HFC32, is proposed for a multi air conditioner for buildings, as an air conditioner (air-conditioning apparatus), which has large capacity and encloses a large amount of a refrigerant.

In accordance with the Amendment (November, 2016) of the Regulation on Refrigeration Safety of the High Pressure Gas Safety Act, HFC32, HFO1234yf, and HFO1234ze are currently treated as inert gas. However, since these refrigerants are slightly combustible, those having 5 tons of refrigeration are necessary to be listed as specified inert gas. Furthermore, it is necessary to install a structure in which a refrigerant is not accumulated when it leaks and a detection alarm in a place where a leaking refrigerant is likely to be accumulated.

On the other hand, a non-combustible mixed refrigerant containing HFO1234yf and HFO1234ze which has a GWP of 1500 or less attracts attention for a refrigerator, from the viewpoint of the above-described Fluorocarbons Emission Control Law. Thus, a product containing R448A and R449A is being developed. However, a non-combustible refrigerant is difficult to achieve unless the GWP of the mixed refrigerant is about from 1100 to 1400. For further lowering the GWP of a refrigerant used in a refrigerator, a refrigerant being low in combustibility or non-combustible is necessary.

A common method for achieving a non-combustible refrigerant is mixing a low-boiling point compound containing an element such as iodine, bromine, and chlorine into a combustible refrigerant. For example, JP-A-2018-44169 discloses a method of mixing trifluoroiodomethane, and JP-A-2017-110225 discloses a method of mixing monochlorotrifluoropropene.

SUMMARY

A refrigerant composition according to an embodiment of the present disclosure is a mixed refrigerant comprising refrigerant components of difluoromethane (HFC32), pentafluoroethane (HFC125), and hexafluoropropene (FO1216). A makeup of the refrigerant components in the mixed refrigerant is configured such that a global warming potential (GWP) is 750 or less, a vapor pressure at 25° C. is in a range of 1.4 to 1.8 MPa, and a flame retardant parameter $F_{mix}$ represented by formula (1) below is 0.46 or more.

$$F_{mix} = \Sigma_i F_i x_i \qquad (1)$$

Here, $F_{mix}$ indicates a flame retardant parameter of the refrigerant composition, $F_i$ indicates a flame retardant parameter of each of the refrigerant components, and $x_i$ indicates a molar fraction of each of the refrigerant components.

DESCRIPTION OF THE EMBODIMENTS

Figure 1:
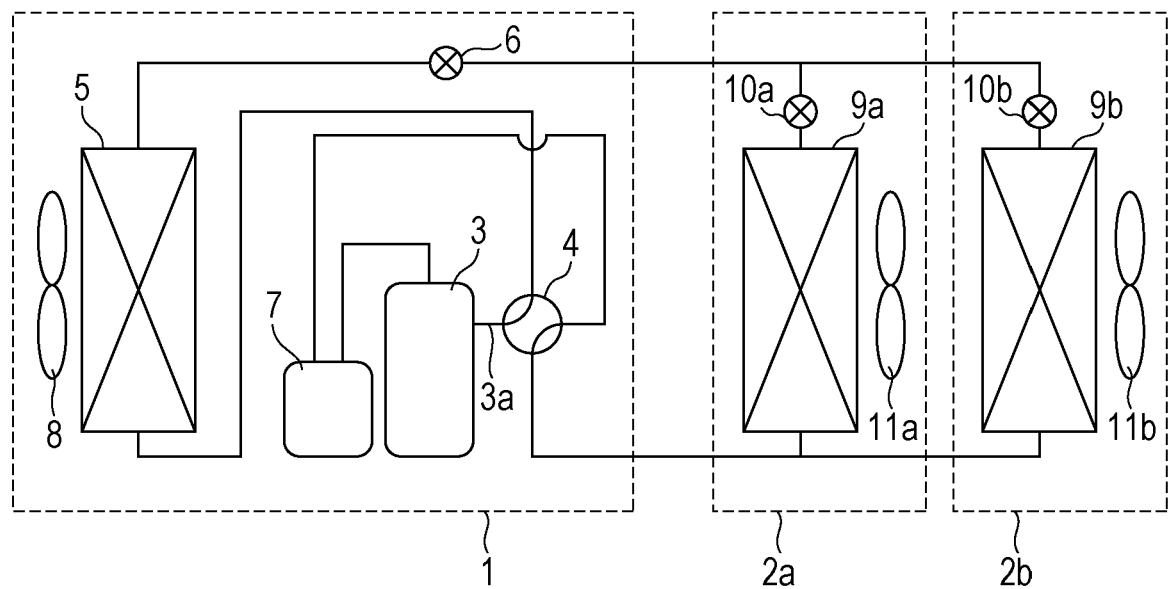
FIG. 1 is a refrigeration cycle configuration diagram illustrating an example of a multi air conditioner for buildings as a refrigeration cycle apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Since a large-sized air conditioner such as a multi air conditioner for buildings has large refrigeration capacity and encloses a large amount of a refrigerant, it is necessary to use a mixed refrigerant having combustibility significantly lower than HFC32 and a GWP of 750 or less. Also, for a refrigerator, it is necessary to use a non-combustible mixed refrigerant having a GWP of 1000 or less.

A demand for global environmental protection is increasing in recent years. The demand is not completely satisfied with known refrigerating and air conditioning technologies, for example, even with those disclosed in JP-A-2018-44169 and JP-A-2017-110225. That is, although the GWP itself of a mixed refrigerant containing trifluoroiodomethane, monochlorotrifluoropropene, and others is low, a large temperature gradient in a heat exchanger causes the decrease of an annual performance factor (APF). This inhibits environmental loads from decreasing in total.

On the other hand, a refrigeration cycle apparatus such as an air conditioner and a refrigerator includes an enclosed electric compressor in which a motor is housed. The enclosed electric compressor is filled with a refrigerator oil for lubricating a sliding portion of the compressor, sealing and cooling the compressor, and others. The properties demanded of this refrigerator oil include the compatibility between a liquid refrigerant and a refrigerator oil (properties of inhibiting the separation into liquid-liquid two layers). In general, a separation region (two phase separation region) of a mixed substance containing a liquid refrigerant and a refrigerator oil exists on the low temperature side and on the high temperature side. Especially, the two layer separation properties, that is, the properties of inhibiting the separation into two phases, of a liquid refrigerant/a refrigerator oil on the low temperature side are important. It is important to ensure an oil return amount from an expansion valve and a heat exchanger (evaporator), in which the temperature becomes low in a refrigeration cycle, to a compressor, in order to improve product reliability.

The situation is that the technology of a currently-used refrigeration cycle apparatus including an enclosed electric compressor with a mixed refrigerant containing trifluoroiodomethane, monochlorotrifluoropropene, and others is not sufficient for ensuring product reliability. Also, since these compounds have the problems of biological toxicity and corrosiveness, and are low in thermochemical stability, the long-term reliability of a refrigeration cycle may not be ensured. Furthermore, since the vapor pressure of these compounds is low, HFC32, HFC125, and others having high vapor pressure are mixed to achieve a pressured level used in a refrigerating and air-conditioning apparatus. In such a case, the temperature gradient in a heat exchanger increases, thereby decreasing heat exchange efficiency.

An object of the disclosed embodiments is to obtain a refrigerant composition which is low in combustibility, has a GWP of 750 or less, and can obtain sufficient refrigeration capacity, and a refrigeration cycle including the refrigerant composition.

For achieving the above-described object, the disclosed embodiments are a refrigerant composition as a mixed refrigerant including three or more refrigerant components, in which the makeup of the refrigerant components in the mixed refrigerant is configured such that a global warming potential (GWP) is 750 or less, a vapor pressure at 25° C. is in a range of 1.4 to 1.8 MPa, and a flame retardant parameter $F_{mix}$ represented by formula (1) below is 0.46 or more:

$$F_{mix} = \Sigma F_i x_i \quad (1)$$

where $F_{mix}$ indicates a flame retardant parameter of the refrigerant composition, Fi indicates a flame retardant parameter of each of the refrigerant components, and $x_i$ indicates a molar fraction of each of the refrigerant components.

Another characteristic of the disclosed embodiments is a refrigerant composition as a mixed refrigerant including refrigerant components of difluoromethane (HFC32), pentafluoroethane (HFC125), and hexafluoropropene (FO1216), in which the makeup of the refrigerant components in the mixed refrigerant is configured such that a global warming potential (GWP) is 750 or less, a vapor pressure at 25° C. is in a range of 1.4 to 1.8 MPa, and a flame retardant parameter $F_{mix}$ represented by formula (1) below is 0.46 or more:

$$F_{mix} = \Sigma F_i x_i \quad (1)$$

where $F_{mix}$ indicates a flame retardant parameter of the refrigerant composition, $F_i$ indicates a flame retardant parameter of each of the refrigerant components, and $x_i$ indicates a molar fraction of each of the refrigerant components.

A further another characteristic of the disclosed embodiments is a refrigeration cycle apparatus including a compressor to compress a refrigerant, a condenser to condense the refrigerant compressed by the compressor, a decompressor to decompress the refrigerant condensed by the condenser, and an evaporator to evaporate the refrigerant decompressed by the decompressor, in which the refrigerant used in the refrigeration cycle apparatus is the above-described refrigerant composition.

The disclosed embodiments have effects of being able to obtain a refrigerant composition which is low in combustibility, has a GWP of 750 or less, and can obtain sufficient refrigeration power, and a refrigeration cycle including the refrigerant composition.

Hereinafter, embodiments of the present disclosure will be described.

The refrigerant composition (mixed refrigerant) according to the disclosed embodiments is used in a refrigeration cycle apparatus such as an air conditioner and a refrigerator.

An enclosed electric compressor (compressor) used in the refrigeration cycle apparatus houses, in an enclosure (pressure container), a compression mechanism (refrigerant compressor) having a sliding portion to compress a refrigerant, and a motor (electric motor) to drive this compression mechanism. The enclosed electric compressor is filled with the mixed refrigerant which is low in combustibility or non-combustible, and a refrigerator oil. Examples of the enclosed electric compressor to be used include a scroll compressor, a screw compressor, a rotary compressor, a twin rotary compressor, a two-stage compression rotary compressor, and a swing-type compressor integrated with a roller and a vane.

<Refrigerant Composition>

The refrigerant composition in the embodiments described herein is preferably a mixed refrigerant containing three refrigerants of difluoromethane (HFC32), pentafluoroethane (HFC125), and hexafluoropropene (FO1216). Also, for obtaining a vapor pressure suitable for the capacity of a refrigerating and air-conditioning apparatus, one or more refrigerants such as HFO1234yf, HFO1234ze, HFC134a, and HFO1123 may be added, other than the three refrigerants, to adjust the vapor pressure which involves refrigeration capacity. Furthermore, when the mixture concentrations of the mixed refrigerant components are adjusted, the temperature gradient in a heat exchanger, which affects the efficiency of the refrigeration cycle apparatus, can be decreased, and a refrigerant being low in combustibility or non-combustible can also be obtained.

In the refrigerant composition according to the disclosed embodiments, the type and makeup of the refrigerant to be mixed are configured such that a global warming potential (GWP) is 750 or less, a vapor pressure at 25° C. is 1.4 to 1.8 MPa, and a flame retardant parameter $F_{mix}$ represented by formula (1) below is 0.46 or more:

$$F_{mix} = \Sigma_i F_i x_i \tag{1}$$

where $F_{mix}$ indicates a flame retardant parameter of the refrigerant composition, $F_i$ indicates a flame retardant parameter of each of the refrigerant components, and $x_i$ indicates a molar fraction of each of the refrigerant components.

The flame retardant parameters of main refrigerants constituting the refrigerant composition according to the disclosed embodiments are as follows.

HFC32: 0.4
HFC125: 0.625
FO1216: 0.677
HFC134a: 0.500
HFO1234yf: 0.444
HFO1234ze: 0.444
HFO1123: 0.500

When the global warming potential GWP is 750 or less, it is preferable because environment performance is excellent, and conformity to laws and regulations such as the Fluorocarbons Emission Control Law is enhanced. Also, when the vapor pressure at 25° C. is 1.4 to 1.8 MPa, it is preferable because changes in a system design from a currently-used common refrigerating and air-conditioning apparatus are reduced, and refrigeration capacity such as air conditioning capacity can be equivalent to that of a currently-used common refrigerating and air-conditioning apparatus. Furthermore, when the flame retardant parameter is 0.46 or more, it is preferable because a non-combustible mixed refrigerant can be obtained.

According to the disclosed embodiments, the three refrigerants of HFC32, HFC125, and FO1216 are included as a main component. Such a combination makeup enables a mixed refrigerant (refrigerant composition) having the above-described properties. Specifically, HFC32 improves refrigeration capacity and efficiency, HFC125 reduces combustibility, and FO1216 decreases both a GWP and combustibility.

Although it is difficult to replace the above-described three refrigerants (HFC32, HFC125, and FO1216) with other refrigerants, it is possible to add and mix other refrigerants to these three refrigerants to improve performance as necessary depending on applications. For example, when the vapor pressure is desired to be increased, it can be achieved by formulating an appropriate amount of HFO1123. Also, when another refrigerant is used as an alternative to R404A, properties similar to the R404A refrigerant can be obtained by formulating a HFC1234-based refrigerant to reduce pressure.

In the refrigerant composition (mixed refrigerant) according to the disclosed embodiments, the formulation ratios are 45% to 60% by weight of difluoromethane (HFC32), 5 to 20% by weight of pentafluoroethane (HFC125), and 30 to 50% by weight of hexafluoropropene (FO1216).

This is because the inclusion of difluoromethane (HFC32) in a content of 45 to 60% by weight improves refrigeration capacity and efficiency, the inclusion of pentafluoroethane (HFC125) in a content of 5 to 20% by weight suppresses combustibility, and the inclusion of hexafluoropropene (FO1216) in a content of 30 to 50% by weight suppresses the decrease of GWPs and combustibility.

The disclosed embodiments achieve a refrigerant composition which has a suppressed GWP of 750 or less, is flame retardant (low in combustibility), and can obtain sufficient refrigeration capacity and efficiency, by adjusting the above-described three types of refrigerants and the formulation ratios thereof as described above.

It is noted that another refrigerant or an additive may be added to the refrigerants (HFC32, HFC125, and FO1216) within the range that does not impair the effects of the disclosed embodiments, as long as the formulation ratios of the three refrigerants are retained. Thus, the properties of the added other refrigerant or additive can be added while maintaining similar properties. For example, the vapor pressure of the refrigerant can be increased by mixing a necessary amount of a refrigerant which increases vapor pressure.

It is noted that since hexafluoropropene (FO1216) is low in thermochemical stability, a stabilizer and a polymerization inhibitor may be desirably formulated. Examples of the stabilizer may include an epoxy-based compound, a nitro-based compound, an amine-based compound, a benzotriazole-based compound, and a pinene-based compound. Examples of the polymerization inhibitor may include a thioether-based compound, an amine-based compound, a nitroso compound, a hydroxy aromatic compound, and a quinone compound.

<Refrigerator Oil>

In the disclosed embodiments, a refrigerator oil with which the enclosed electric compressor is filled (sealed) is polyol ester oil or polyvinyl ether oil each having a kinematic viscosity at 40° C. of 30 to 100 mm$^2$/s in which the low-temperature-side critical solution temperature between the refrigerant composition (mixed refrigerant) and the refrigerator oil according to the disclosed embodiments is +10° C. or less.

Examples of the polyol ester oil to be used include a compound represented by Chemical Formula 1 below, a compound represented by Chemical Formula 2 below, and a mixture thereof. It is noted that $R^1$ to $R^{10}$ in the formulae below indicate an alkyl group of 4 to 9 carbons, and may be identical or different.

The polyvinyl ether oil contains as a base oil a component represented by Chemical Formula 3 below. In this formula, $O—R^{11}$ is a methyloxy group, an ethyloxy group, a propyloxy group, or a butyloxy group, and n is 5 to 15.

It is noted that when the refrigerator oil has a kinematic viscosity at 40° C. of 30 to 100 $mm^2/s$, it is preferable in terms of ensuring the lubricity in the compressor and the sealing performance of a compressor when the refrigerant is dissolved in oil.

A temperature of low-temperature two layer separation, that is, a temperature at which the refrigerant and the refrigerator oil are separated into two layers, can be lowered by using, as the polyol ester oil, the compound represented by Chemical Formula 1 below, the compound represented by Chemical Formula 2 below, or a mixture thereof such that the low-temperature-side critical solution temperature between the mixed refrigerant and the refrigerator oil becomes +10° C. or less.

Also, when the polyvinyl ether oil is used, similar low-temperature two layer separation properties can be obtained by using polyvinyl ether oil containing as a base oil the component represented by Chemical Formula 3 below.

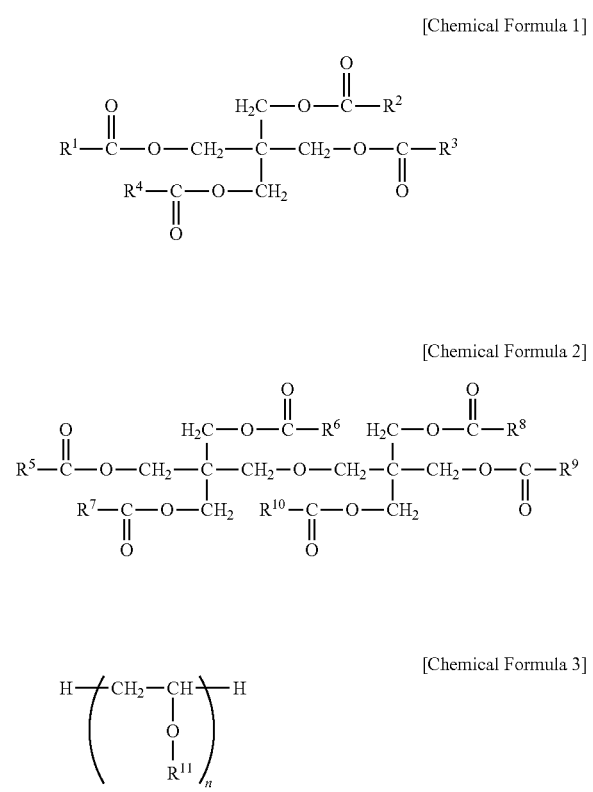

To the polyol ester oil and the polyvinyl ether oil used in the disclosed embodiments, there may be added a lubricity improver, an antioxidant, an acid scavenger, a defoamer, a metal deactivator, and others.

A preferable example of the antioxidant is DBPC (2,6-di-t-butyl-p-cresol) which is based on phenol.

As the acid scavenger, an aliphatic epoxy-based compound and a carbodiimide-based compound, which are a compound having an epoxy ring, may be desirably used.

It is desirable that the polyvinyl ether oil contain tertiary phosphate as an extreme pressure agent in an amount of 0.1 to 2.0% by weight relative to oil. Examples of the tertiary phosphate include tricresyl phosphate, triphenyl phosphate and a derivative thereof, trixylenyl phosphate, cresyl diphenyl phosphate, 2-ethylhexyl diphenyl phosphate, and tris(2-ethylhexyl) phosphate.

On the other hand, paraffin-based mineral oil, naphthene-based mineral oil, poly-α-olefin oil, soft-type alkyl benzene oil, and others are not used, because compatibility with the non-combustible refrigerant composition (mixed refrigerant) according to the disclosed embodiments is poor.

Application Example to Air Conditioner

FIG. 1 is a refrigeration cycle configuration diagram illustrating an example of a multi air conditioner for buildings (multi-room air conditioner) as the refrigeration cycle apparatus including the refrigerant composition (mixed refrigerant) and the refrigerator oil according to the disclosed embodiments. The multi air conditioner for buildings includes an outdoor device 1 and indoor devices 2a, 2b, . . . .

In the outdoor device 1, there are housed a compressor 3, a four-way valve 4, an outdoor heat exchanger 5, a decompressor (outdoor expansion valve; expansion device) 6 constituted by an electronic expansion valve, a thermal expansion valve, and the like, an accumulator 7, a fan 8 to ventilate the outdoor heat exchanger 5, and others. The compressor 3 is constituted by an enclosed electric compressor housing, in an enclosure, a compression mechanism (refrigerant compressor) having a sliding portion and a motor (electric motor) to drive this compression mechanism.

The indoor devices 2a, 2b, . . . respectively house indoor heat exchangers 9a, 9b, . . . , decompressors (indoor expansion valves; expansion devices) 10a, 10b, . . . each constituted by an electronic expansion valve, a thermal expansion valve, and the like, fans 11a, 11b, . . . to ventilate the indoor heat exchangers 9a, 9b, . . . , and others.

Also, the refrigerant composition and refrigerator oil according to the disclosed embodiments are injected in a refrigeration cycle constituting the multi air conditioner for buildings.

For cooling the interior in a room, a high-temperature, high-pressure refrigerant gas adiabatically compressed in the compressor 3 passes through a discharge pipe 3a and the four-way valve (switching valve) 4, and is cooled in the outdoor heat exchanger 5 which serves as a condenser, so that the refrigerant gas is transformed into a high-pressure liquid refrigerant. This refrigerant is decompressed in the decompressor 6 for expansion to be transformed into a gas-liquid two phase refrigerant (a low-temperature, low-pressure liquid slightly containing gas), flows into the indoor heat exchangers 9a, 9b, . . . which serve as an evaporator, and deprives the air in a room of heat for evaporation to be transformed into a low-temperature, low-pressure gas refrigerant. This gas refrigerant passes through the four-way valve 4 again, and enters the accumulator 7. In the accumulator 7, the low-temperature, low-pressure liquid refrigerant having failed to evaporate in the indoor heat exchangers 9a, 9b, . . . is isolated, and sucked into the compressor 3. Thereafter, a similar refrigeration cycle is repeated.

For heating the interior in a room, the four-way valve 4 is switched so that a high-temperature, high-pressure gas refrigerant flows to the side of the indoor heat exchangers 9a, 9b, . . . . In this case, the indoor heat exchangers 9a and 9b serve as a condenser, and the outdoor heat exchanger 5 serves as an evaporator.

Application Example to Refrigerator

Figure 2:
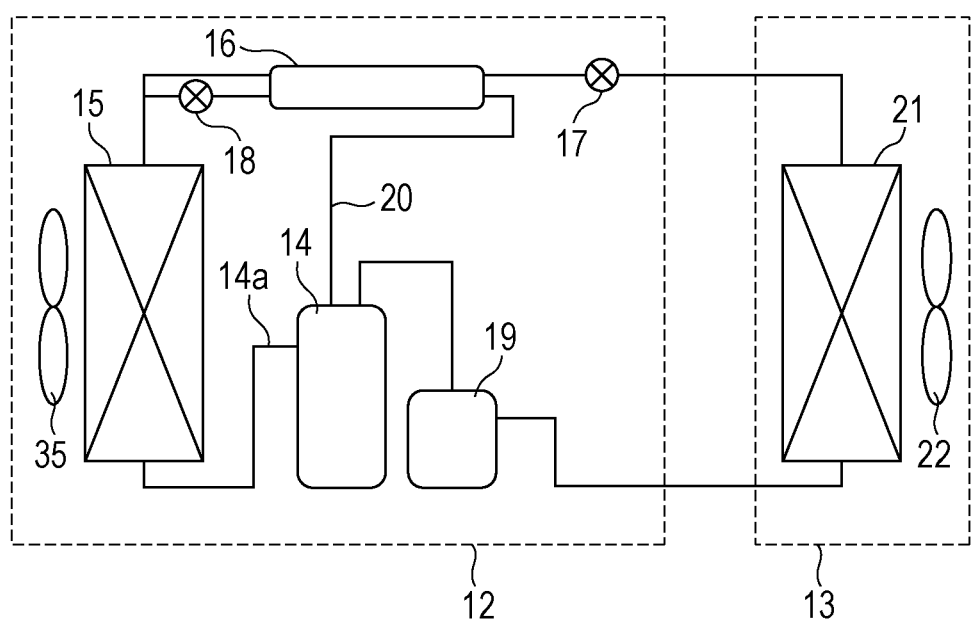
FIG. 2 is a refrigeration cycle configuration diagram illustrating an example of a refrigerator as a refrigeration cycle apparatus.

FIG. 2 is a refrigeration cycle configuration diagram illustrating an example of a refrigerator as the refrigeration cycle apparatus including the refrigerant composition (mixed refrigerant) and the refrigerator oil according to the disclosed embodiments. The refrigerator includes a heat source device (outdoor device) 12 and a cooler 13 such as a showcase.

The heat source device 12 includes a compressor 14, a condenser (heat source-side heat exchanger) 15, a supercooler 16, decompressors (expansion devices) 17 and 18 constituted by an electronic expansion valve and the like, an accumulator 19, a fan 35 to ventilate the condenser 15, and others. The heat source device 12 further includes a supercooling refrigerant circuit (economizer circuit) 20 in which part of a liquid refrigerant discharged from the condenser 15 is branched and decompressed in the decompressor 18, and the decompressed refrigerant is flown into the supercooler 16 to further cool a main refrigerant flowing through the supercooler 16.

The compressor 14 is constituted by an enclosed electric compressor which houses, in an enclosure, a compression mechanism (refrigerant compressor) having a sliding portion, and a motor (electric motor) to drive this compression mechanism.

The cooler 13 includes an evaporator (user-side heat exchanger) 21 and a fan 22 to ventilate this evaporator 21.

Furthermore, a refrigeration cycle constituting the refrigerator is filled with the refrigerant composition and the refrigerator oil according to the disclosed embodiments.

A high-temperature, high-pressure refrigerant gas adiabatically compressed in the compressor 14 is discharged from a discharge pipe 14a to flow into the condenser 15, and cooled for condensation. Part of the high-pressure liquid refrigerant discharged from the condenser 15 is branched to the supercooling refrigerant circuit 20, and the remaining main liquid refrigerant passes through the supercooler 16 to be further supercooled. Thereafter, the supercooled refrigerant expands in the decompressor 17 to be transformed into a low-temperature, low-pressure gas-liquid two phase refrigerant slightly containing gas, and delivered into the cooler 13. The refrigerant delivered into the cooler 13 derives the air of heat in the evaporator 21 to be transformed into a low-temperature, low-pressure gas refrigerant, and passes through the accumulator 19. Thereafter, the gas refrigerant returns to the compressor 14. Then, a similar refrigeration cycle is repeated.

The compression ratio of the refrigerant in the compressor 14 for refrigerators is as high as about 10 to 20. Thus, the temperature of the refrigerant gas is likely to become high. Therefore, part of the liquid refrigerant discharged from the condenser 15 is branched to the supercooling refrigerant circuit 20 to be transformed into a low-temperature, low-pressure liquid refrigerant containing gas by the decompressor 18 such as a capillary tube. The low-temperature, low-pressure liquid gas further supercools a main high-pressure liquid refrigerant in the supercooler 16. The refrigerant branched to the supercooling refrigerant circuit 20 passes through the supercooler 16, and thereafter returns to the intermediate pressure part of the compressor 14. In the compressor 14, the refrigerant decreases the temperature of a sucked refrigerant to lower the discharge temperature.

It is noted that although the refrigerant of the supercooling refrigerant circuit 20 is injected into the intermediate pressure part of the compressor 14 in the example illustrated in FIG. 2, it may be configured to be injected into the suction side of the compressor 14.

<Configuration of Compressor>

Figure 3:
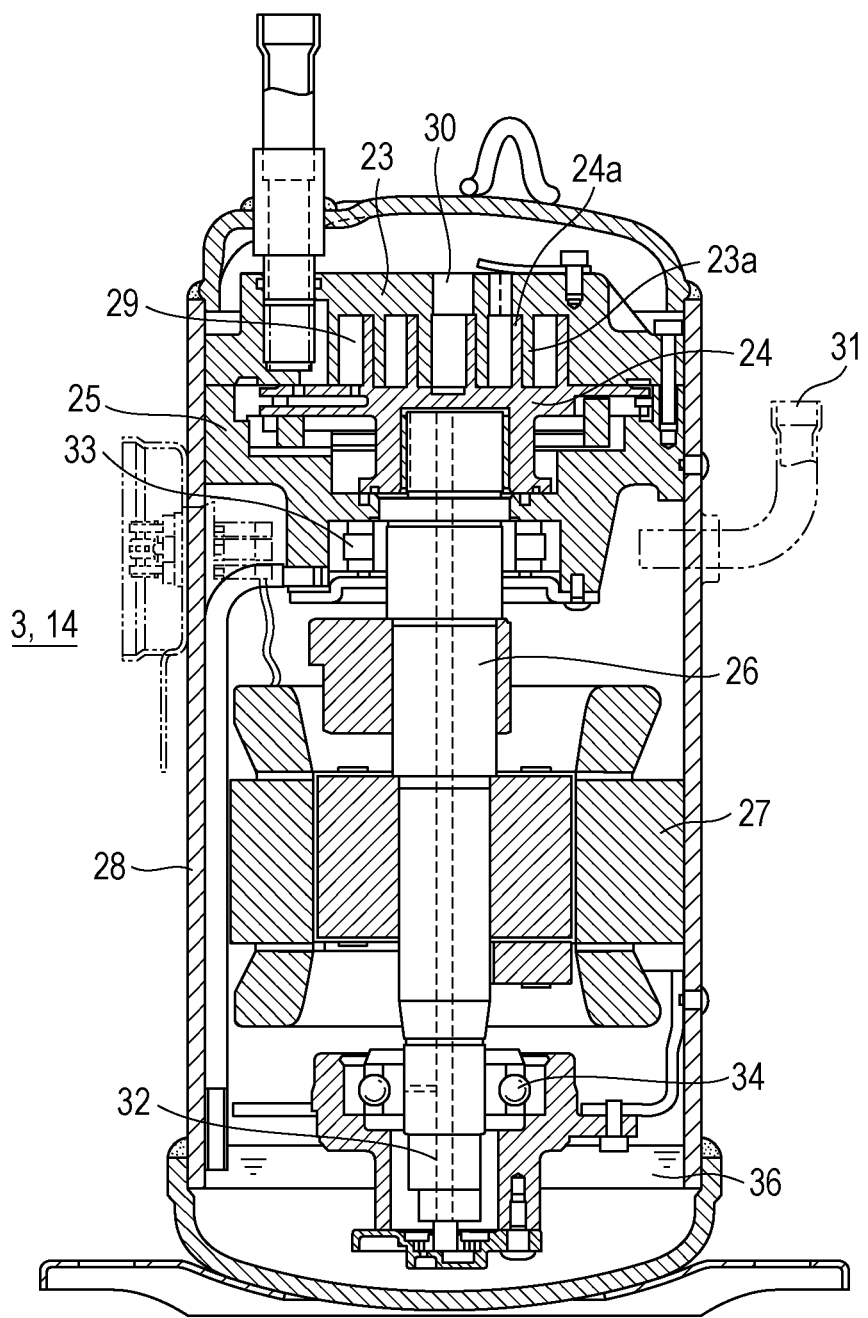
FIG. 3 is a vertical cross-sectional diagram illustrating an example of a scroll compressor as an enclosed electric compressor used in a refrigeration cycle apparatus.

As the compressor 3 used in the air conditioner and the compressor 14 used in the refrigerator, an enclosed electric compressor is used. An example of this enclosed electric compressor will be described with reference to FIG. 3. FIG. 3 is a vertical cross-sectional diagram illustrating an example of a scroll compressor as the enclosed electric compressor.

The compressors 3 and 14 are similar as illustrated in FIG. 3. The compressors 3 and 14 include a fixed scroll member 23 containing a spiral fixed scroll wrap 23a which is vertically disposed to an end plate, a rotary scroll member 24 containing a spiral rotary wrap 24a which substantially has the same shape as the fixed scroll member 23, a frame 25 to support the rotary scroll member 24, a crankshaft 26 to rotate the rotary scroll member 24, a motor (electric motor) 27, and an enclosure (pressure container) 28 which houses these constituents.

The fixed scroll wrap 23a and the rotary wrap 24a face and mesh with each other to form a compression mechanism. The rotary scroll member 24 is rotated by the crankshaft 26. With the rotation motion of the crankshaft 26, an outermost compression chamber 29, among compression chambers 29 formed between the fixed scroll member 23 and the rotary scroll member 24, moves toward the center of the fixed scroll member 23 and the rotary scroll member 24 while gradually decreasing in volume.

When the compression chamber 29 reaches the vicinity of the center of the fixed scroll member 23 and the rotary scroll member 24, the compression chamber 29 communicates with a discharge port 30, and a compressed refrigerant gas is discharged into the enclosure 28. The compressed gas discharged into the enclosure 28 is discharged from a discharge pipe 31 disposed to the enclosure 28 into the refrigeration cycle outside the compressors 3 and 14.

The compressors 3 and 14 initiate compression actions with the rotation of the crankshaft 26 at a constant speed or at a rotation speed depending on a voltage controlled by an inverter (not illustrated). Also, an oil reservoir 36 is disposed below the electric motor 27. Oil in this oil reservoir 36 passes through an oil hole 32 disposed to the crankshaft 26 by pressure difference, and supplied for the lubrication of a sliding portion between the rotary scroll member 24 and the crankshaft 26, a rolling bearing constituting a main bearing 33 to support a main shaft portion of the crankshaft 26 and an auxiliary bearing 34 to support an auxiliary shaft portion of the crankshaft 26, and others.

Example 1

Refrigerants 1 to 10 (refrigerants according to Example 1) illustrated in Table 1 as the refrigerant composition according to the disclosed embodiments were estimated for vapor pressure, temperature gradient, refrigeration capacity (refrigeration effect), and theoretical efficiency, and evaluated for combustibility.

(Estimation of Vapor Pressure, Temperature Gradient, Refrigeration Capacity, and Theoretical Efficiency)

The vapor pressure, temperature gradient, refrigeration capacity, and theoretical efficiency were estimated with PERPROP Version 9.1 (refrigerant thermophysical properties database software by National Institute of Standards and Technology (NIST). The estimation condition was an evaporation temperature of 0° C., a condensation temperature of 40° C., an evaporator superheating degree of 5° C., a condenser supercooling degree of 5° C., and no loss.

(Evaluation of Combustibility)

The combustibility in the mixed refrigerant for refrigerating and air-conditioning apparatuses was evaluated in accordance with ASTM E681-09(b) (American Society for Testing and Materials). The condition was a temperature of 23° C., a humidity of 50%, and a pressure of 101.3 kPa.

The refrigerants 1 to 10 in Table 1 are each a refrigerant including HFC32/HFC125/FO1216 as the basic makeup according to the disclosed embodiments with varied concentrations. These refrigerants 1 to 10 according to Example 1 were evaluated for the GWP, flame retardant parameter, vapor pressure at 25° C., temperature gradient, cooling effect, volumetric capacity, theoretical COP (coefficient of performance), and combustibility. The results are indicated in Table 1.

refrigerants a to c as a comparative example are refrigerants containing one component of HFC32, HFC125, and FO1216 respectively. The concentration of each of HFC32/HFC125/FO1216 in the refrigerants d to h as a comparative example is different from that in the refrigerants 1 to 10 according to Example 1. The refrigerant i as a comparative example is a R410A (HFC410A) refrigerant.

The mixed refrigerants indicated in the refrigerants 1 to 10 according to Example 1 exhibit non-combustibility even when the GWP is 750 or less, and have a vapor pressure of 1.4 MPa or more. Therefore, refrigeration capacity similar to R410A indicated in the refrigerant i according to Comparative Example 1 is obtained.

In contrast to this, it is understood that the refrigerants a to i according to Comparative Example 1 are inappropriate as a refrigerant, because they are combustible, have a GWP of more than 750, exhibit a low vapor pressure thereby failing to obtain sufficient refrigeration capacity, or the like. Also, as indicated in the refrigerants d to h according to

TABLE 1

| | | Refrigerant (wt %) | | | | Flame retardant | Vapor pressure | Temperature gradient | Cooling effect | Volumetric capacity | Theoretical | |
| --- | --- | --- | --- | --- | --- | --- | --- | --- | --- | --- | --- | --- |
| | | HFC32 | HFC125 | FO1216 | GWP | parameter | (MPa)at25° C. | (° C.) | (kJ/kg) | (kJ/m$^3$) | COP | Combustibility |
| Example 1 | Refrigerant 1 | 54 | 12 | 34 | 750 | 0.460 | 1.535 | 1.30 | 171 | 4589 | 5.18 | Non-combustible |
| | Refrigerant 2 | 49 | 13 | 38 | 750 | 0.470 | 1.507 | 1.56 | 163 | 4445 | 5.13 | Non-combustible |
| | Refrigerant 3 | 45 | 14 | 41 | 750 | 0.480 | 1.483 | 1.78 | 156 | 4324 | 5.08 | Non-combustible |
| | Refrigerant 4 | 40 | 15 | 45 | 750 | 0.490 | 1.449 | 2.12 | 147 | 4157 | 5.03 | Non-combustible |
| | Refrigerant 5 | 54 | 11 | 35 | 725 | 0.460 | 1.531 | 1.34 | 171 | 4574 | 5.18 | Non-combustible |
| | Refrigerant 6 | 52 | 12 | 36 | 725 | 0.465 | 1.523 | 1.42 | 168 | 4527 | 5.16 | Non-combustible |
| | Refrigerant 7 | 54 | 10 | 36 | 700 | 0.460 | 1.527 | 1.37 | 171 | 4559 | 5.26 | Non-combustible |
| | Refrigerant 8 | 49 | 12 | 39 | 700 | 0.465 | 1.503 | 1.60 | 162 | 4430 | 5.22 | Non-combustible |
| | Refrigerant 9 | 54 | 9 | 37 | 650 | 0.460 | 1.523 | 1.41 | 171 | 4544 | 5.26 | Non-combustible |
| | Refrigerant 10 | 49 | 10 | 41 | 650 | 0.465 | 1.494 | 1.68 | 162 | 4397 | 5.38 | Non-combustible |
| Comparative Example 1 | Refrigerant a | 100 | — | — | 677 | 0.400 | 1.690 | 0.00 | 256 | 5476 | 5.52 | Combustible |
| | Refrigerant b | — | 100 | — | 3170 | 0.625 | 1.378 | 0.00 | 91 | 3692 | 5.13 | Non-combustible |
| | Refrigerant c | — | — | 100 | 0 | 0.677 | 0.736 | 0.00 | 88 | 2111 | 5.39 | Non-combustible |
| | Refrigerant d | 60 | 11 | 29 | 750 | 0.450 | 1.565 | 1.03 | 182 | 4749 | 5.33 | Combustible |
| | Refrigerant e | 36 | 16 | 48 | 750 | 0.500 | 1.420 | 2.41 | 140 | 4016 | 5.06 | Non-combustible |
| | Refrigerant f | 60 | 10 | 30 | 725 | 0.450 | 1.561 | 1.06 | 182 | 4735 | 5.32 | Combustible |
| | Refrigerant g | 60 | 9 | 31 | 700 | 0.450 | 1.558 | 1.10 | 182 | 4721 | 5.32 | Combustible |
| | Refrigerant h | 60 | 8 | 32 | 650 | 0.450 | 1.554 | 1.13 | 182 | 4706 | 5.32 | Combustible |
| | Refrigerant i | 50 | 50 | — | 1920 | 0.500 | 1.655 | 0.12 | 170 | 5016 | 5.40 | Non-combustible |

It is noted that the GWP of the refrigerants 1 to 10 according to the present example in Table 1 was calculated based on the values in the Fifth Assessment Report (AR5) of the Intergovernmental Panel on Climate Change (IPCC).

Also, refrigerants a to i as Comparative Example 1 and their evaluation results are described in Table 1 as well. The Comparative Example 1, it is understood that a combination of HFC32/HFC125/FO1216 with different mixture concentrations (makeup ratios of refrigerants) causes the refrigerant to become combustible, or decreases the vapor pressure to less than 1.4 MPa like the refrigerant e, thereby reducing refrigeration capacity.

The refrigerants 1 to 10 according to Example 1 are all a refrigerant having a GWP of 750 or less, a vapor pressure of 1.4 MPa or more, and non-combustibility.

Example 2

The refrigerant 6 according to Example 1 indicated in Table 1 was added with various refrigerator oils, and tested for the compatibility with the added refrigerant oils. The results will be described with reference to Table 2.

(Low-Temperature-Side Critical Solution Temperature)

The compatibility evaluation between the refrigerant and the refrigerator oil was measured in accordance with JIS K 2211 of Japanese Industrial Standard. In the test, a pressure-resistant glass container was filled with the refrigerant at an optional oil concentration, and the content was observed while varying the temperature. When the content was clouded, it was judged to be separated into two layers. When transparent, it was judged to be dissolved. A temperature at which a solution containing the refrigerant and the refrigerator oil is to be separated into two layers depends on the concentration of the refrigerator oil. This oil concentration dependence generally presents a curve having a maximum value. This maximum value was defined as the low-temperature-side critical solution temperature, and indicated in Table 2.

Refrigerator oils A to G used in the test are indicated below. Here, the viscosity is the kinematic viscosity at 40° C.

(A) Hindered-type polyol ester oil (H-POE) (mixed fatty acid ester oil of pentaerythritol-based 2-ethylhxanoic acid/3,5,5-trimethylhexanoic acid): 64.9 mm$^2$/s in viscosity at 40° C.

(B) Hindered-type polyol ester oil (H-POE) (mixed fatty acid ester oil of pentaerythritol/dipentaerythritol-based 2-methylbutanoic acid/2-ethylhxanoic acid): 68.7 mm$^2$/s in viscosity at 40° C.

(C) Polyvinyl ether oil (PVE) (copolymer ether oil which is a polymer of alkoxy vinyl, having an ethyloxy group and an isobutyloxy group as an alkoxy group): 66.8 mm$^2$/s in viscosity at 40° C.

(D) Polyalkylene glycol oil (PAG) (polypropylene glycol oil having a methyloxy group at both terminals): 67.2 mm$^2$/s in viscosity at 40° C.

(E) Naphthene-based mineral oil: 54.1 mm$^2$/s in viscosity at 40° C.

(F) Poly-α-olefin oil: 61.8 mm$^2$/s in viscosity at 40° C.

(G) Polyvinyl ether oil (PVE) (ether oil which is a polymer of alkoxy vinyl, having an ethyloxy group as an alkoxy group): 67.8 mm$^2$/s in viscosity at 40° C.

Refrigerator oils which are compatible with the refrigerant indicated in Table 2 were selected, and the low-temperature-side critical solution temperatures were measured. Table 2 indicates the results.

TABLE 2

| | | Refrigerant (wt %) | | | Refrigerator oil | Low-temperature-side critical solution temperature (° C.) |
| --- | --- | --- | --- | --- | --- | --- |
| | | HFC32 | HFC125 | FO1216 | | |
| Example 2 | Combination 1 | 52 | 12 | 36 | A | −30 |
| | Combination 2 | 52 | 12 | 36 | B | −47 |
| | Combination 3 | 52 | 12 | 36 | C | −53 |
| Comparative Example 2 | Combination a | 52 | 12 | 36 | D | +15 |
| | Combination b | 52 | 12 | 36 | E | Two layer separation |
| | Combination c | 52 | 12 | 36 | F | Two layer separation |
| | Combination d | 100 | — | — | G | +4 |
| | Combination e | 50 | 50 | — | C | −48 |

Combinations 1 to 3 according to Example 2 were obtained by respectively combining the above-described refrigerator oils A to C to the refrigerant 6 described in Example 1, and measured for low-temperature-side critical solution temperature. As a result, the low-temperature-side critical solution temperature for the combination 1 was −30° C. Similarly, the result was −47° C. for the combination 2, and −53° C. for the combination 3. It is noted that other refrigerants 1 to 5 and 7 to 10 indicated in Example 1 were also combined with the above-described refrigerator oils A to C, and the low-temperature-side critical solution temperatures were almost similar to the above-described results.

This demonstrates that all of the refrigerator oils A to C have good compatibility with the mixed refrigerants of the refrigerants 1 to 10 indicated in Example 1. Especially, a multi air conditioner for buildings has remarkably long piping. Accordingly, when compatibility is favorable, the refrigerator oil discharged together with the refrigerant from the compressor does not remain in the low temperature part (an expansion valve and an evaporator) of the refrigeration cycle, and returns to the inside of the compressor. Therefore, an oil loss in the compressor can be suppressed, and a sufficient oil amount in the compressor can be ensured.

Also, Table 2 describes Comparative Example 2 as well. Combinations a to c according to Comparative Example 2 were obtained by combining the above-described refrigerator oils D to F to the same refrigerant as those (the refrigerant 6 according to Example 1) indicated in the combinations 1 to 3 according to Example 2, and measured for low-temperature-side critical solution temperature. As a result, the low-temperature-side critical solution temperature was as high as +15° C. for the combination a, and the refrigerant was separated into two layers for the combinations b and c, demonstrating being non-compatible. Thus, it was found that the low-temperature-side critical solution temperature significantly varies depending on the degree of the compatibility between the refrigerant and the refrigerator oil. That is, it is understood that the refrigerator oil of the combination a according to Comparative Example 2 has a high low-temperature-side critical solution temperature, and hydrocarbon oil such as naphthene mineral oil and poly-α-olefin oil indicated in the combinations b and c according to Comparative Example 2 is completely non-compatible with the mixed refrigerants. Therefore, with the combinations a to c according to Comparative Example 2, the refrigerator oil can remain in the low temperature part of the refrigeration cycle to reduce the oil content in the compressor.

The results for the compatibility of a refrigerator oil including R410A and HFC32 currently used in a multi air conditioner for buildings are indicated in combinations d and e according to Comparative Example 2. The combination d according to Comparative Example 2 is a refrigerant containing only HFC32. When the above-described refrigerator oil G is combined, the low-temperature-side critical solution temperature becomes +4° C. Furthermore, the combination e according to Comparative Example 2 is a R410A (HFC410A) refrigerant. When the above-described refrigerator oil C is combined, the low-temperature-side critical solution temperature becomes −48° C. In this manner, the low-temperature-side critical solution temperatures are both +10° C. or less.

Example 3

Using a 28-kW multi air conditioner for buildings mounted with a scroll compressor as the previously-described enclosed electric compressor, a 3000-hour durability test was performed under a high-speed, high-load condition. The compressor was operated at a rotation speed of 6000 $min^{-1}$. A 250-µm heat-resistant PET film (B type, 130° C.) was used for the insulation between an iron core and a coil of a motor, and a double coated copper wire having a double coating of polyester imide-amide imide was used as the main insulation of a coil.

The mixed refrigerant (GWP=about 725) of HFC32/HFC125/FO1216 according to the refrigerant 6 of Example 1 was used as a refrigerant, and injected in an amount of 8000 g into a sealed refrigeration cycle. The refrigerator oil A (hindered-type polyol ester oil having a kinematic viscosity at 40° C. of 64.9 $mm^2/s$) used in the combination 1 according to Example 2 was previously injected as a refrigerator oil in an amount of 1500 ml into the compressor.

After this multi air conditioner for buildings was operated for 3000 hours, the scroll compressor was disassembled, and checked for the wear state and the flaking occurrence state of a rolling bearing.

The results of the durability test according to Example 3 in which an actual machine was used are as follows. It was found that since the oil return properties to the scroll compressor was sufficient, flaking was not observed in a rolling element such as a main bearing and an auxiliary bearing constituted by a rolling bearing of the scroll compressor and on a raceway surface of an inner ring and an outer ring, and little wear was observed in a sliding portion such as a wrap tip of a rotary scroll and a fixed scroll and an Oldham ring.

Also, for determining the deterioration of the refrigerator oil, the total acid number was measured by a titration method. The total acid number after the test was as low as 0.03 mgKOH/g.

Example 4

The previously-described refrigerant 6 according to Example 1 and a 28-kW multi air conditioner for buildings were used to calculate annual performance factor (APF). A combination of two ceiling cassette-type four-direction 14-kW indoor devices was used, and the calculation condition was APF2015 based on JIS B8615-3:2015 of Japanese Industrial Standard. The calculation conditions are indicated in Table 3.

TABLE 3

| Test conditions | Outdoor air temperature | Generation capacity | Operated outdoor devices |
|---|---|---|---|
| Cooling rated standard | 35° C. | 100% | 2 devices |
| Cooling intermediate standard | 35° C. | 50% | 2 devices |
| Cooling intermediate moderate temperature | 29° C. | 50% or more | 2 devices |
| Cooling minimum moderate temperature | 29° C. | 25% | 1 device |
| Heating rated standard | Dry-bulb temperature 7° C./ Wet-bulb temperature 6° C. | 100% | 2 devices |
| Heating intermediate standard | Dry-bulb temperature 7° C./ Wet-bulb temperature 6° C. | 50% | 2 devices |
| Heating minimum standard | Dry-bulb temperature 7° C./ Wet-bulb temperature 6° C. | 25% | 1 device |
| Heating maximum low temperature | Dry-bulb temperature 2° C./ Wet-bulb temperature 1° C. | | 2 devices |

The calculation in accordance with APF2015 is performed based on "offices in Tokyo." Here, the rotational speed of the compressor was adjusted such that the generation capacity becomes a prescribed value. Other actuators (such as a fan) were adjusted for each refrigerant so that they are properly operated.

Also, for comparison, R410A was used as a refrigerant for the same 28-kW multi air conditioner for buildings as the previously-described multi air conditioner for buildings. With the same conditions indicated in Table 3, the APF was calculated.

Under the conditions of cooling rated standard and heating rated standard indicated in Table 3, a specific enthalpy difference was larger in Example 4 in which the refrigerant 6 (HFC32/HFC125/FO1216 mixed refrigerant) according to Example 1 was used than the comparative example in which R410A was used.

The coefficient of performance (COP) under the cooling intermediate moderate temperature condition indicated in Table 3 was equivalent between Example 4 in which the refrigerant 6 according to Example 1 was used and the comparative example in which a R410A refrigerant was used. The APF was also equivalent between Example 4 in which the refrigerant 6 according to Example 1 was used and the comparative example in which a R410A refrigerant was used.

Also, the results calculated with other refrigerants 1 to 5 and 7 to 10 according to Example 1 were almost similar to the above-described result calculated with the refrigerant 6.

From the above results, it was found that when the refrigerant according to the disclosed embodiments is used, an efficient air-conditioner having a small environmental load and a reliable enclosed electric compressor can be obtained. Similar effects were obtained not only in the air conditioner but also in the refrigerator illustrated in FIG. 2.

According to the above-described embodiments, there can be obtained a refrigerant composition which is low in combustibility or non-combustible, has a GWP of 750 or less, and can obtain sufficient refrigeration capacity. Also, when this refrigerant composition is used in a refrigeration cycle apparatus, the temperature gradient in a heat exchanger can be decreased, thereby achieving an air conditioner and a refrigerator which are efficient and small in environment loads. Furthermore, when a refrigerator oil having favorable compatibility with the refrigerant composition is combined, there can be achieved a refrigeration cycle apparatus which can improve oil return properties into a compressor and also has excellent long-term reliability.

The refrigerant composition and the refrigeration cycle apparatus including the refrigerant composition according to the disclosed embodiments are useful for environmentally friendly air conditioners and refrigerators.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A refrigerant composition as a mixed refrigerant comprising refrigerant components of difluoromethane (HFC32), pentafluoroethane (HFC125), and hexafluoropropene (FO1216),
   wherein a makeup of the refrigerant components in the mixed refrigerant is configured such that a global warming potential (GWP) is 750 or less, a vapor pressure at 25° C. is in a range of 1.4 to 1.8 MPa, and a flame retardant parameter $F_{mix}$ represented by formula (1) below is 0.46 or more:

$$F_{mix} = \Sigma_i F_i x_i \quad (1)$$

Wherein $F_{mix}$ indicates a flame retardant parameter of the refrigerant composition, $F_i$ indicates a flame retardant parameter of each of the refrigerant components, and $x_i$ indicates a molar fraction of each of the refrigerant components.

2. The refrigerant composition according to claim 1, wherein the mixed refrigerant is configured such that a refrigerant makeup is 45 to 65% by weight of difluoromethane (HFC32), 5 to 20% by weight of pentafluoroethane (HFC125), and 30 to 50% by weight of hexafluoropropene (FO1216).

3. The refrigerant composition according to claim 2, wherein the mixed refrigerant further includes another refrigerant or an additive while the formulation ratios of the three refrigerants (HFC32, HFC125, and FO1216) are retained.

4. A refrigeration cycle apparatus comprising:
   a compressor to compress a refrigerant;
   a condenser to condense the refrigerant compressed by the compressor;
   a decompressor to decompress the refrigerant condensed by the condenser; and
   an evaporator to evaporate the refrigerant decompressed by the decompressor,
   wherein the refrigerant used in the refrigeration cycle apparatus is the refrigerant composition according to claim 1.

5. The refrigeration cycle apparatus according to claim 4, wherein
   the compressor is an enclosed electric compressor including, in an enclosure, a compression mechanism and a motor to drive the compression mechanism, the enclosed electric compressor being filled with a refrigerator oil to lubricate a sliding portion,
   the refrigerator oil is polyol ester oil having a kinematic viscosity at 40° C. of 30 to 100 mm²/s,
   a low-temperature-side critical solution temperature between the refrigerator oil and the mixed refrigerant is +10° C. or less, and
   the polyol ester oil is one or a mixture of a compound represented by Chemical Formula 1 below and a compound represented by Chemical Formula 2 below (wherein $R^1$ to $R^{10}$ indicate an alkyl group of 4 to 9 carbons, and are identical or different):

[Chemical Formula 1]

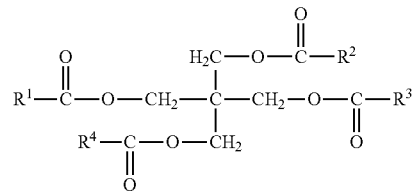

[Chemical Formula 2]

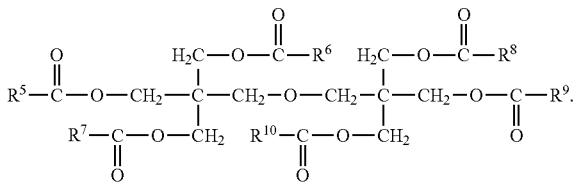

6. The refrigeration cycle apparatus according to claim 4, wherein
   the compressor is an enclosed electric compressor including, in an enclosure, a compression mechanism and a motor to drive the compression mechanism, the enclosed electric compressor being filled with a refrigerator oil to lubricate a sliding portion,
   the refrigerator oil is polyvinyl ether oil having a kinematic viscosity at 40° C. of 30 to 100 mm²/s,
   a low-temperature-side critical solution temperature between the refrigerator oil and the mixed refrigerant is +10° C. or less, and
   the polyvinyl ether oil includes a base oil represented by Chemical Formula 3 below (wherein O—$R^{11}$ is any one of a methyloxy group, an ethyloxy group, a propyloxy group, and a butyloxy group, and n is 5 to 15):

[Chemical Formula 3]

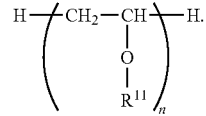

7. The refrigeration cycle apparatus according to claim 4, wherein
the refrigeration cycle apparatus is an air conditioner,
the air conditioner comprises
an outdoor device including the compressor and an outdoor heat exchanger to serve as the condenser or the evaporator, and
an indoor device including an indoor heat exchanger to serve as the evaporator or the condenser,
the outdoor device further includes a switching valve to switch a direction of the refrigerant discharged from the compressor to the outdoor heat exchanger side or to the indoor heat exchanger side to cool or heat a space in which the indoor device is installed.

8. The refrigeration cycle apparatus according to claim 4, wherein
the refrigeration cycle apparatus is a refrigerator, and
the refrigerator comprises
a heat source device including the compressor and a heat source-side heat exchanger to serve as the condenser, and
a cooler including a user-side heat exchanger to serve as the evaporator.

9. The refrigeration cycle apparatus according to claim 8, wherein the heat source device includes:
the decompressor;
a supercooler disposed between the heat source-side heat exchanger and the decompressor; and
a supercooling refrigerant circuit in which part of a refrigerant discharged from the heat source-side heat exchanger is branched and decompressed, led into the supercooler to further cool a main refrigerant flowing through the supercooler, and injected into an intermediate pressure part or a suction side of the compressor.

* * * * *